(No Model.)
J. R. McELROY.
WIRE STRETCHING AND STAPLE PULLING DEVICE.
No. 586,862. Patented July 20, 1897.
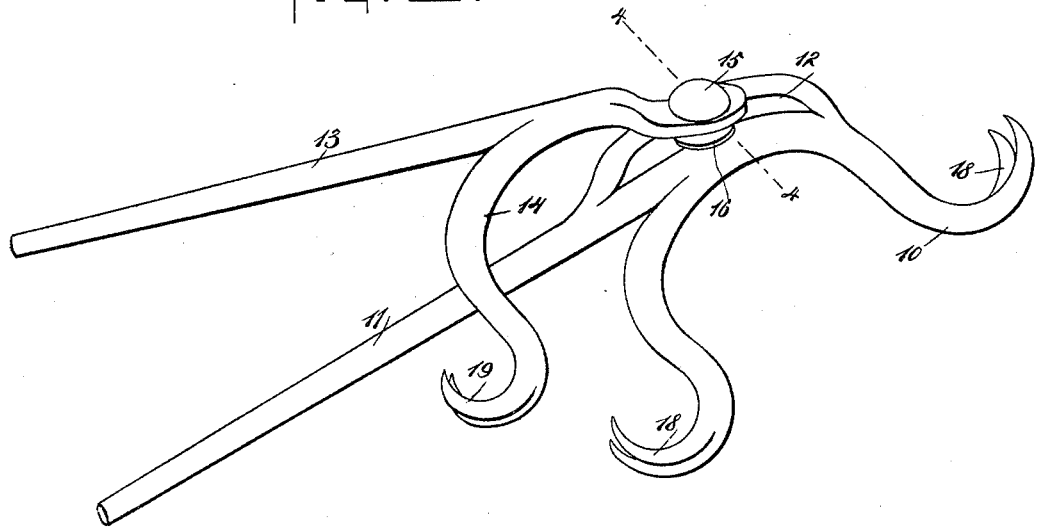
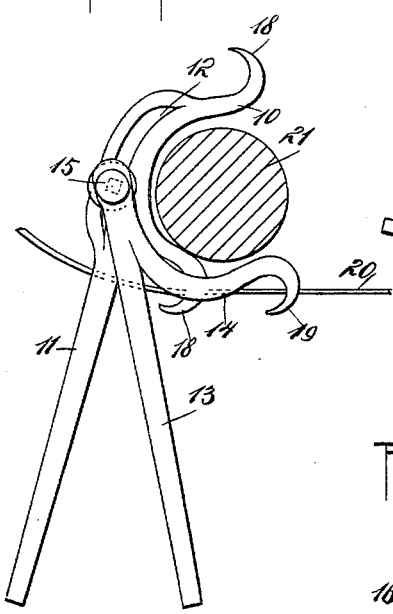
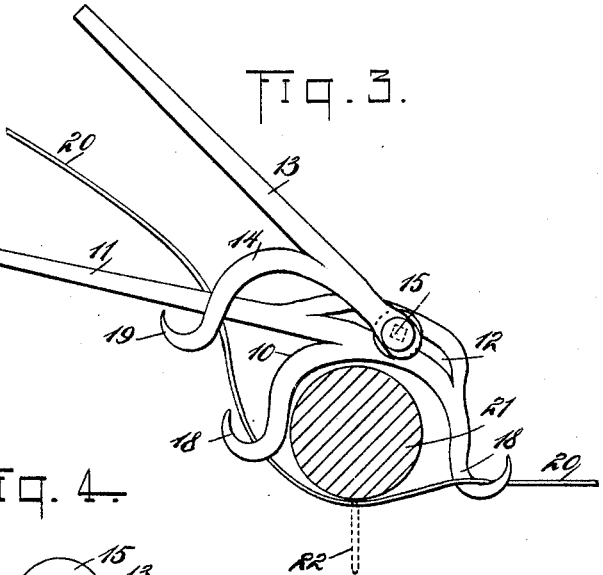
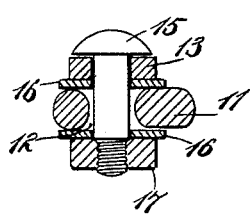
WITNESSES:
INVENTOR
J. R. McElroy
BY
ATTORNEYS.

UNITED STATES PATENT OFFICE.

JESSE ROBERTS McELROY, OF SOUTHMAYD, TEXAS.

WIRE-STRETCHING AND STAPLE-PULLING DEVICE.

SPECIFICATION forming part of Letters Patent No. 586,862, dated July 20, 1897.

Application filed April 23, 1897. Serial No. 633,490. (No model.)

*To all whom it may concern:*

Be it known that I, JESSE ROBERTS McELROY, of Southmayd, in the county of Grayson and State of Texas, have invented a new and Improved Wire-Stretching, Staple-Pulling, and Wire-Splicing Device, of which the following is a full, clear, and exact description.

The invention relates to that class of tools which is adapted for stretching wire for fencing purposes and which may also be used for drawing the staples from the posts and splicing between posts when such action is necessary.

Another object of the invention is to so construct the tool that it may be used in connection with any form of fence-post and may be operated in a manner to obtain successive grips on the wire, thus facilitating the stretching of the wire and holding said wire under tension to which it may have been subjected.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved tool. Fig. 2 is a horizontal section through a post, illustrating the tool applied for stretching wire that has already been placed upon a fence. Fig. 3 is a view similar to Fig. 2, but illustrates the application of the tool in stretching wire that is to be newly laid upon a fence; and Fig. 4 is a transverse section taken substantially on the line 4 4 of Fig. 1.

A U-shaped jaw 10 or a jaw of like shape is attached to or is made integral with a handle 11, the handle 11 being connected in a parallel manner with the bow-section of the jaw, and where the handle connects with the jaw the said handle is enlarged in order that a longitudinal slot 12 may be made therein. A second handle 13 is also provided, which is attached to a jaw 14, extending at an angle from the handle, being curved in like manner as one of the members of the U-shaped jaw 10. The handle 13 is connected loosely and adjustably with the handle 11 through the medium of a pivot-pin 15. This pivot-pin is passed through a suitable aperture in the forward end of the handle 13, as shown in Fig. 4, and thence through the slot 12 in the handle 11. Washers 16 are located above and below the handle 11, around the pivot-pin 15, and the lower end of the pivot-pin carries a nut 17. Each member of the jaw 10 terminates in a claw 18, the claws extending in opposite directions, being curved in direction of the handle 11. The jaw 14 also terminates in a claw 19, which is curved in direction of the corresponding claw of the jaw 10. The handles 11 and 13 act in the capacity of levers. In Fig. 2 the device is illustrated in use for drawing taut the wire 20, which has already been placed upon the fence. The jaw 10 is made to receive the fence-post 21, and the handle 11 of that jaw is manipulated in a manner to cause the claw which is nearest the wire to engage therewith and draw the wire in a direction to place tension thereon. The wire having been drawn as far as possible by the engaging claw of the jaw 10 and being held by said jaw under the tension obtained the handle 13 is next manipulated in a manner to bring its claw 19 in engagement with the wire to place said wire under further tension, the sliding movement of the handle 13 on the handle 11 admitting of the jaw 14 being advanced a required distance beyond the post.

In Fig. 3 the device is shown in the position for stretching new wire upon a fence. In this case the wire is carried over one of the claws 18 of the jaw 10 and through the opposite claw, and when the handle attached to this jaw has been manipulated to bring the wire under as much tension as possible the wire may be placed under greater tension by causing the single jaw 14 to engage with the wire back of the jaw 10, and thus alternately each jaw is brought into action until the wire has been brought under the necessary tension.

What has heretofore been termed a "single jaw" 14 is properly an arm extended from the handle 13, and in Fig. 3 when the wire has been stretched as desired the staple is driven into the post 21, the wire being held by the claws of the tool. Any of the claws may be readily brought into action for withdrawing a staple from a post, the claws being shaped in substantially the same manner as the claws of a hammer or other nail-puller.

The tool is very useful for splicing wire where the wire becomes broken between posts, and in this connection it is used as follows: One end of the broken wire is gripped by a claw 18 and the other end of the wire is caught by the claw 19, the levers or handles 11 and 13 being placed at angles to one another, usually a right angle. The levers are now moved in a direction to draw the two ends of the wire together and cause the ends of the wire to pass each other. When the wire has been sufficiently drawn, the tool is turned once over, thereby forming loops at the ends of the wire suitable for tying the two ends together.

Having thus described my invention, I claim as new and desire to secure by Letters Patent—

1. The combination with a jaw comprising two members, the members terminating in claws, of a handle connected with said jaw, and a second handle held to slide between the claws, and an arm extending from the second handle also terminating in a claw.

2. The combination with a curved jaw comprising a body and two members, the members terminating in claws, and a handle connected with the said curved jaw, having a longitudinal slot therein, of a second handle held to slide in said slot, the second handle being provided with a single-membered jaw also terminating in a claw.

3. The combination with a curved jaw having two members each terminating in a claw, the claws facing in opposite directions, and a handle connected with said jaw, provided with a slot in that portion adjacent to the jaws, of a second handle provided with a pivot-pin extending within the said slot, and a jaw consisting of a single member, curved in substantially the same manner as the adjacent member of the double-membered jaw, the said single jaw terminating in a claw.

4. A tool for stretching wire and for similar purposes, consisting of a U-shaped jaw the members whereof terminate in oppositely-facing claws, a handle connected with the U-shaped jaw, a second handle slidably and pivotally connected with that attached to the U-shaped jaw, said second handle being provided with a member at an angle thereto, and terminating in a claw.

5. A tool for stretching wire and for similar purposes, consisting of a jaw substantially U-shaped, terminating in claws facing in opposite directions, a handle attached to the body portion of the jaw, a second handle slidably and pivotally mounted upon the first-named handle, and an arm projected from the pivoted handle, terminating in a claw, facing in direction of the claw on the adjacent member of the U-shaped jaw.

JESSE ROBERTS McELROY.

Witnesses:
JOHN CAREY,
J. C. CAREY.